(12) United States Patent
Monbaliu et al.

(10) Patent No.: US 11,974,521 B2
(45) Date of Patent: May 7, 2024

(54) BALE CHAMBER ARRANGEMENT FOR AN AGRICULTURAL BALER

(71) Applicant: CNH Industrial America LLC, New Holland, PA (US)

(72) Inventors: Sven Monbaliu, Zuienkerke (BE); Frederik Demon, Bruges (BE)

(73) Assignee: CNH Industrial America LLC, New Holland, PA (US)

( * ) Notice: Subject to any disclaimer, the term of this patent is extended or adjusted under 35 U.S.C. 154(b) by 566 days.

(21) Appl. No.: 17/245,062

(22) Filed: Apr. 30, 2021

(65) Prior Publication Data
US 2021/0243955 A1    Aug. 12, 2021

Related U.S. Application Data

(63) Continuation of application No. PCT/EP2019/079738, filed on Oct. 30, 2019.

(30) Foreign Application Priority Data

Nov. 2, 2018 (EP) .................................. 18204212

(51) Int. Cl.
*A01F 15/04* (2006.01)
*A01F 15/08* (2006.01)
*A01F 15/14* (2006.01)

(52) U.S. Cl.
CPC ........ *A01F 15/046* (2013.01); *A01F 15/0825* (2013.01); *A01F 2015/048* (2013.01); *A01F 15/145* (2013.01)

(58) Field of Classification Search
CPC .. A01F 15/0841; A01F 15/042; A01F 15/046; A01F 15/0825; A01F 15/145;
(Continued)

(56) References Cited

U.S. PATENT DOCUMENTS

| 3,241,479 A | 3/1966 | Grillot |
| 2013/0269547 A1* | 10/2013 | Boone ................. A01F 15/0825 100/191 |

(Continued)

FOREIGN PATENT DOCUMENTS

| BE | 1026120 A1 | 10/2019 |
| DE | 80 19 277.4 U1 | 11/1981 |
| GB | 963566 | 7/1964 |

OTHER PUBLICATIONS

Notification of Transmittal of the International Search Report and the Written Opinion of the International Searching Authority, or the Declaration dated Jan. 30, 2020 for International Patent Application No. PCT/EP2019/079738 (9 pages).

(Continued)

*Primary Examiner* — Abigail A Risic
(74) *Attorney, Agent, or Firm* — Peter K. Zacharias; Rebecca L. Henkel; Rickard K. DeMille

(57) ABSTRACT

An agricultural baler includes a main bale chamber extending in a bale forming direction from an inlet end to an outlet end. The main bale chamber includes a plurality of stationary walls and a plurality of movable density doors positioned downstream from the stationary walls, relative to the bale forming direction. The stationary walls include a ceiling, a first side wall and a second side wall. A plunger compresses and moves the crop material from the inlet end towards the outlet end of the bale chamber. The baler is characterized in that the first side wall, the second side wall and/or the ceiling comprises a constriction surface, which constricts the main bale chamber in a direction transverse to the bale forming direction.

20 Claims, 7 Drawing Sheets

(58) Field of Classification Search
CPC . A01F 2015/048; F16H 37/124; A01B 71/06;
F16D 2500/10437; F16D 2500/30406
See application file for complete search history.

(56) References Cited

U.S. PATENT DOCUMENTS

| | | | |
|---|---|---|---|
| 2016/0029565 A1* | 2/2016 | Coen | G01B 21/06 |
| | | | 702/94 |
| 2017/0013782 A1* | 1/2017 | Kindt | A01F 15/0825 |
| 2017/0367267 A1* | 12/2017 | Schrag | B30B 9/3025 |
| 2018/0192591 A1* | 7/2018 | Monbaliu | A01F 15/0825 |

OTHER PUBLICATIONS

Extended European Search Report dated Apr. 16, 2019 for European Patent Application No. 18204212.7 (6 pages).

* cited by examiner

BALE CHAMBER ARRANGEMENT FOR AN AGRICULTURAL BALER

CROSS REFERENCE TO RELATED APPLICATION

This application is a continuation of International Application No. PCT/EP2019/079738 filed Oct. 30, 2019, which claims priority to European Application No. 18204212.7 filed Nov. 2, 2018, the contents of which are incorporated herein by reference.

FIELD OF THE INVENTION

The present invention relates to agricultural balers, and, more particularly, to bale chamber arrangements used in such balers.

BACKGROUND OF THE INVENTION

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

On a large square baler, a pickup unit at the front of the baler gathers the cut and windrowed crop material from the ground. The pickup unit includes a pickup roll, and optionally may include other components such as side shields, stub augers, wind guard, etc.

A packer unit is used to move the crop material from the pickup unit to a duct or pre-compression chamber. The packer unit forms a wad of crop within the pre-compression chamber, which is then transferred to a main bale chamber. (For purposes of discussion, the charge of crop material within the pre-compression chamber will be termed a "wad", and the charge of crop material after being compressed within the main bale chamber will be termed a "flake"). Typically such a packer unit includes packer tines or forks to move the crop material from the pickup unit into the pre-compression chamber. Instead of a packer unit it is also known to use a rotor cutter unit, which chops the crop material into smaller pieces.

A stuffer unit transfers the wad of crop material in charges from the pre-compression chamber to the main bale chamber. Typically such a stuffer unit includes stuffer forks which are used to move the wad of crop material from the pre-compression chamber to the main bale chamber, in sequence with the reciprocating action of a plunger within the main bale chamber.

In the main bale chamber, the plunger compresses the wad of crop material into flakes to form a bale and, at the same time, gradually advances the bale toward the outlet of the bale chamber. The plunger reciprocates, back and forth, toward and away from the discharge end of the baler. The plunger may include a number of rollers, which extend laterally outward from the sides of the plunger. The rollers on each side of the plunger are received within a respective plunger slot formed in the sidewalls of the bale chamber, with the plunger slots guiding the plunger during the reciprocating movements.

When enough flakes have been added and the bale reaches a full (or other predetermined) size, a number of knotters are actuated which wrap and tie twine, cord or the like around the bale while it is still in the main bale chamber. The twine is cut and the formed baled is ejected out the back of the baler as a new bale is formed.

Typically the bale chamber includes a stationary ceiling, floor and a pair of side walls at the upstream end of the bale chamber. The ceiling and side walls terminate adjacent to a number of so-called "doors", including a top door and two side doors. The doors are pivoted about a pivot axis at the upstream end and clamp against the formed bale to hold the bale and provide resistance as a next bale is formed in the bale chamber. The stationary ceiling and side walls of the bale chamber are flat (i.e., generally planar), leading into the area between the doors.

Belgian Pat. App. No. BE 2018/5184 discloses a bale chamber having movable doors, with the movable doors having a convex shape defining an apex in the inner wall of the doors. A density ring actuator system can be used to adjust the angle of the doors, relative to the bale formation direction. Formation of the movable doors with an apex in the inner wall of the doors provides additional strength to the doors in the areas of the highest stress, and also provides bales with a more uniform bale density.

SUMMARY OF THE INVENTION

The present invention provides an agricultural baler with a constriction surface formed in the stationary side walls and/or ceiling of the main bale chamber.

The invention in one form is directed to an agricultural baler including a main bale chamber extending in a bale forming direction from an inlet end to an outlet end. The main bale chamber includes a plurality of stationary walls and a plurality of movable density doors positioned downstream from the stationary walls, relative to the bale forming direction. The stationary walls include a ceiling, a first side wall and a second side wall. A plunger compresses and moves the crop material from the inlet end towards the outlet end of the bale chamber. The baler is characterized in that the first side wall, the second side wall and/or the ceiling comprises a constriction surface, the constriction surface comprises an upstream end located immediately downstream from the extended position of the plunger and a downstream end located downstream of the upstream end and immediately preceding the plurality of movable density doors, relative to the bale forming direction, and the top door, the first side door, and the second side door each comprise an inwardly angled surface, relative to the bale forming direction, such that the constriction surface and the angled surfaces constricts the main bale chamber in a direction transverse to the bale forming direction.

In another form of the invention, the ceiling includes a constriction surface.

In another form of the invention, each of the first side wall and the second wall includes a constriction surface.

In another form of the invention, the constriction surface is rigidly fixed or removable.

In another form of the invention, the constriction surfaces is removable and adjustable.

In another form of the invention, the constriction surface is rigidly fixed in the form of an angled plate.

In yet another form of the invention, the plunger moves between a retracted position and an extended position, and the constriction surface includes an upstream end and a downstream end, relative to the bale forming direction. The upstream end of the constriction surface is located downstream from the extended position of the plunger.

In yet another form of the invention, the baler includes a plurality of density doors including a first side door positioned downstream and adjacent to the first side wall, and a second side door positioned downstream and adjacent to the second side wall.

In still another form of the invention, the first side door and the second side door each include an inwardly angled surface, relative to the bale formation direction. The constriction surface of the first side wall terminates at the inwardly angled surface of the first side door, and the constriction surface of the second side wall terminates at the inwardly angled surface of the second side door.

In still another form of the invention, each of the constriction surfaces projects inwardly from the associated adjacent first side door or second side door, thereby defining a stop inhibiting movement of a bale in a direction opposite to the bale forming direction.

In another form of the invention, the at least one constriction surface is positioned at a downstream end of the ceiling, first side wall and/or second side wall, relative to the bale forming direction.

In another form of the invention, the ceiling includes a constriction surface which is formed as part of a knotter frame above the main bale chamber.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
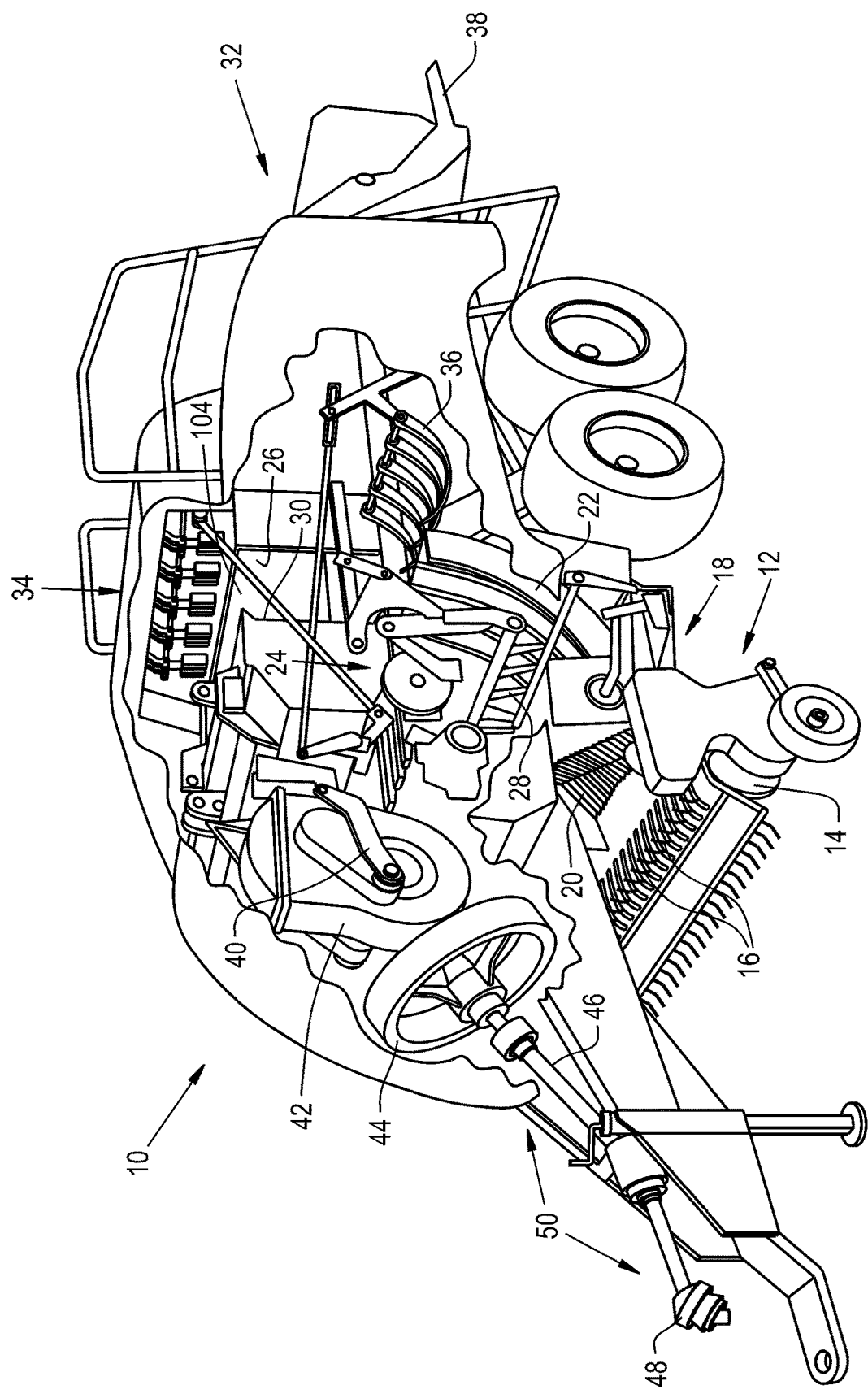
FIG. 1 is a perspective cutaway view showing the internal workings of a large square baler, which can include a main bale chamber with one of more constriction surfaces of the present invention.
Figure 2:
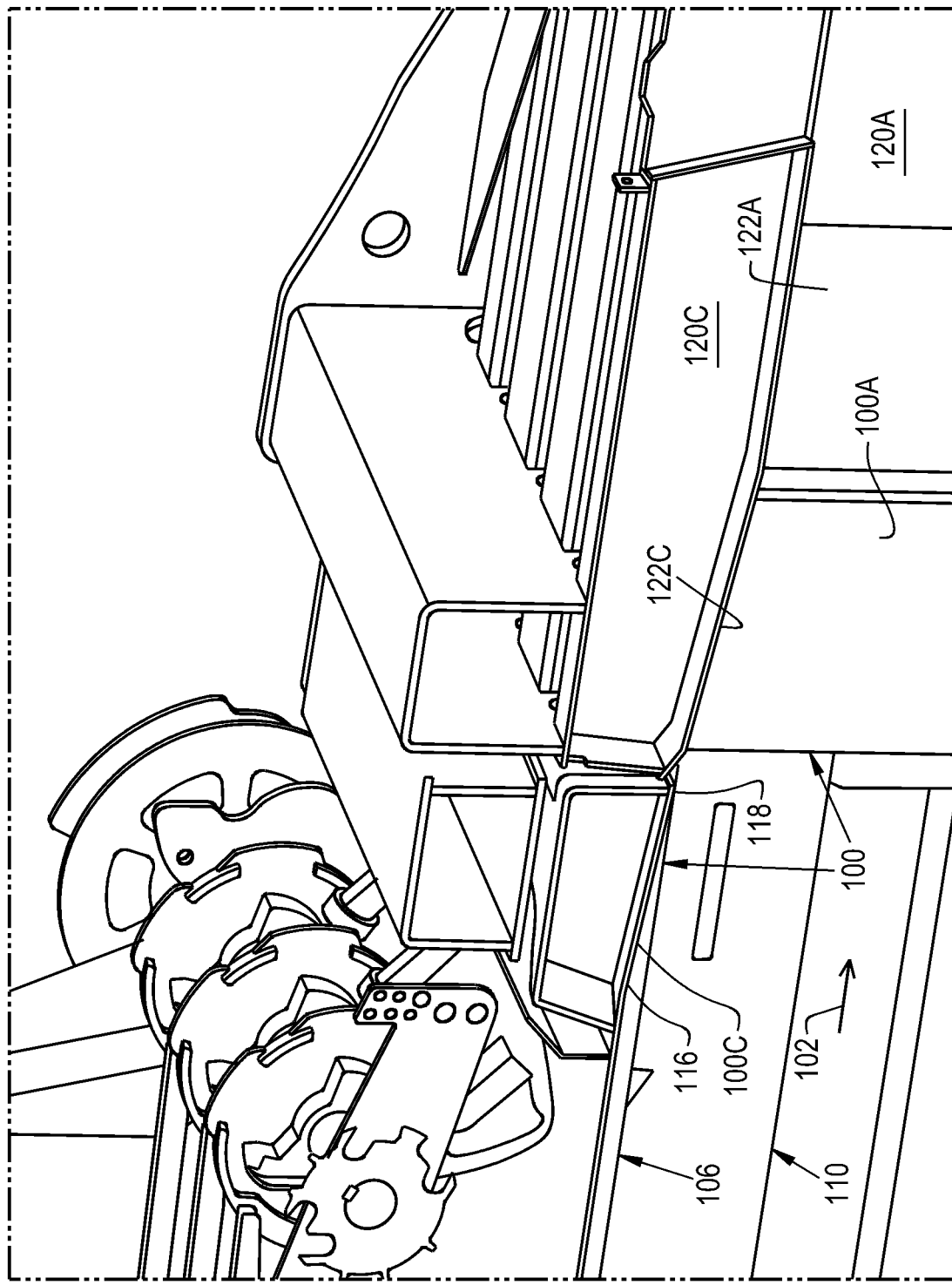
FIG. 2 is a perspective view of a portion of a main bale chamber showing constriction surfaces in the ceiling and a side wall.

Referring now to the drawings, and more particularly to FIG. 1, there is shown a perspective cutaway view showing the internal workings of a large square baler 10. The baler 10 operates on a two stage feeding system. Crop material is lifted from windrows into the baler 10 using a pickup unit 12. The pickup unit 12 includes a rotating pickup roll 14 with tines 16 which move the crop rearward toward a packer unit 18. An optional pair of stub augers (one of which is shown, but not numbered) are positioned above the pickup roll 14 to move the crop material laterally inward. The packer unit 18 includes packer tines 20 which push the crop into a pre-compression chamber 22 to form a wad of crop material. The packer tines 20 intertwine the crop together and pack the crop within the pre-compression chamber 22. The pre-compression chamber 22 and the packer tines 20 function as the first stage for crop compression. Once the pressure in the pre-compression chamber 22 reaches a predetermined sensed value, a stuffer unit 24 moves the wad of crop from the pre-compression chamber 22 to a main bale chamber 26. The stuffer unit 24 includes stuffer forks 28 which thrust the wad of crop directly in front of a plunger 30, which reciprocates within the main bale chamber 26 and compresses the wad of crop into a flake. The stuffer forks 28 return to their original stationary state after the wad of material has been moved into the main bale chamber 26. The plunger 30 compresses the wads of crop into flakes to form a bale and, at the same time, gradually advances the bale toward an outlet end 32 of the main bale chamber 26. The main bale chamber 26 and the plunger 30 function as the second stage for crop compression. When enough flakes have been added and the bale reaches a full (or other predetermined) size, knotters 34 are actuated which wrap and tie twine around the bale while it is still in the main bale chamber 26. Needles 36 bring the lower twine up to the knotters 34 and the tying process then takes place. The twine is cut and the formed bale is ejected from a discharge chute 38 as a new bale is formed.

The plunger 30 is connected via a crank arm 40 with a gear box 42. The gear box 42 is driven by a flywheel 44, which in turn is connected via a drive shaft 46 with the power take-off (PTO) coupler 48. The PTO coupler 48 is detachably connected with the PTO spline at the rear of the traction unit, such as a tractor (not shown). The PTO coupler 48, the drive shaft 46 and the flywheel 44 together define a portion of a driveline 50, which provides rotative power to the gearbox 42. The flywheel 44 has a sufficient mass to carry the plunger 30 through a compression stroke as power is applied to the drive shaft 46 by the traction unit (not shown).

Referring now to FIGS. 2-6, there is shown a portion of the baler 10, including a plurality of constriction surfaces 100 for constricting the cross-sectional area of the main bale chamber 26. More specifically, the main bale chamber 26 extends in a bale forming direction 102 from an inlet end 104 to the outlet end 32. The main bale chamber 26 includes a floor 108 (aka. bottom wall), and a plurality of stationary walls including a ceiling 106 (aka. top wall), a first side wall 110, and a second side wall 112. The main bale chamber 26 also includes a plurality of movable density doors 120 positioned downstream from the stationary walls 106, 110 and 112. The first side wall 110, the second side wall 112 and/or the ceiling 106 includes the constriction surface 100 terminating at the downstream end of the stationary walls 106, 110, 112, which constricts the main bale chamber 26 in a direction transverse to the bale forming direction 102. In the illustrated embodiment, each of the first side wall 110, the second side wall 112 and the ceiling 106 include a constriction surface 100 at their downstream end. By constricting or reducing the cross sectional area of the main bale chamber 26, the constriction surfaces 100 squeeze down or compress the crop forming the bale prior to entering the area between the density doors.

In the embodiment shown, each constriction surface 100 is in the form of a plate that is rigidly fixed as part of the respective side wall 110, 112 and ceiling 106. More specifically, the constriction surfaces 100A, 100B forming an inner surface of the side walls 110, 112 are formed as a plate that is welded to the frame of the main bale chamber 26. Spacers 114 of sequentially increasing size are positioned behind the plate to provide the plate with a desired orientation (i.e., angle) and stand off distance (see FIGS. 4 and 5). Similarly, the constriction surfaces 100C forming an inner surface of the ceiling 106 are rigidly affixed as part of the ceiling 106. However, the constriction surfaces 100C are formed as a bend in the plates defining the ceiling 106 (see FIGS. 2 and 6, conjunctively).

The constriction surfaces 100 are located relative to the plunger 30 when the plunger 30 is at a fully extended position. More specifically, the plunger 30 moves between a retracted position (where crop is introduced into the main bale chamber 26) and an extended position (where crop is at a maximum compression). The constriction surfaces 100 each include an upstream end 116 and a downstream end 118, relative to the bale forming direction 102. The upstream end 116 of the constriction surfaces 100 are located downstream from the plunger 26 when the plunger 26 is at the fully extended position.

Figure 4:
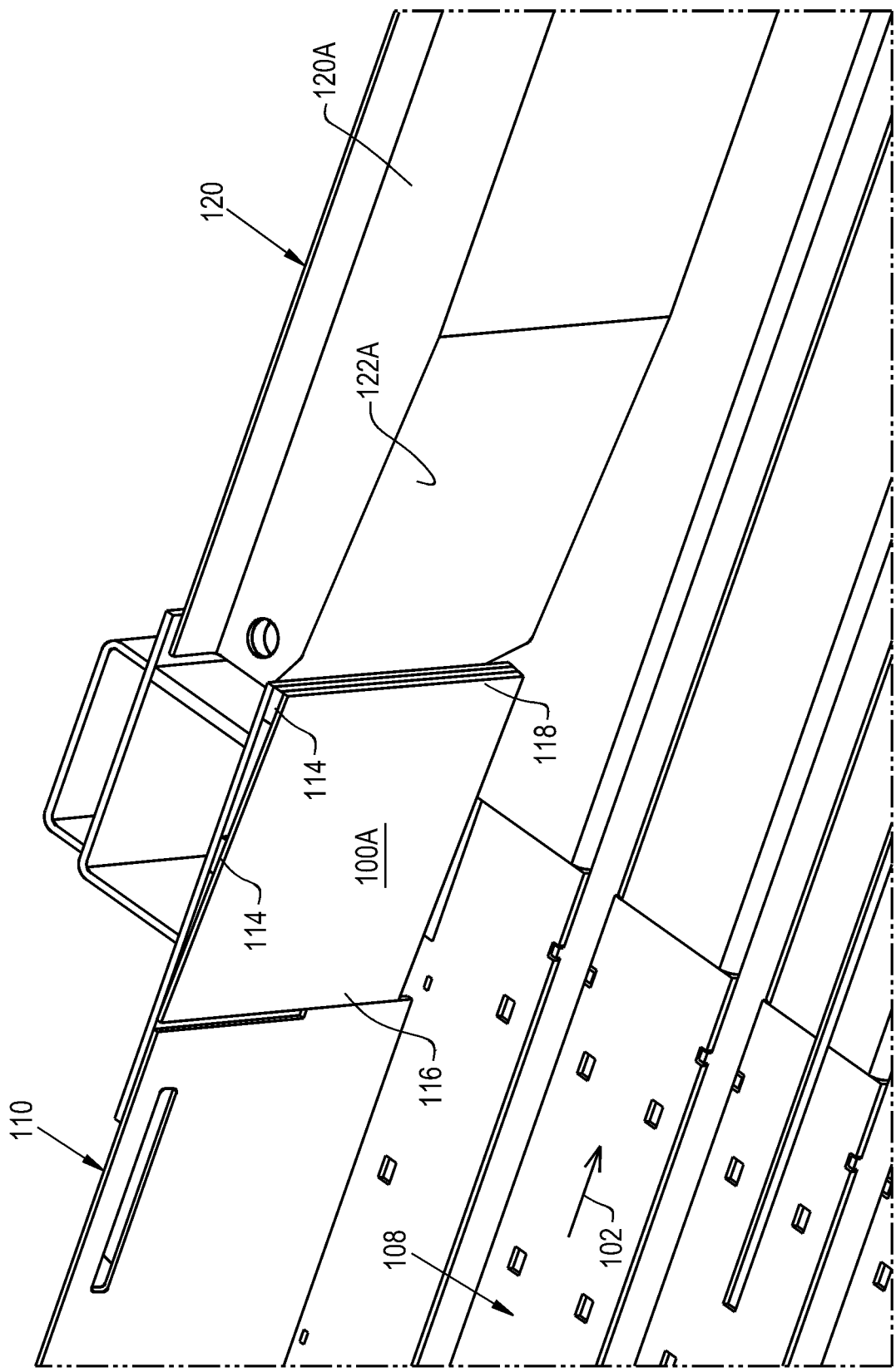
FIG. 4 is a top perspective view of a portion of the main bale chamber showing a constriction surface in the side wall of the main bale chamber.
Figure 5:
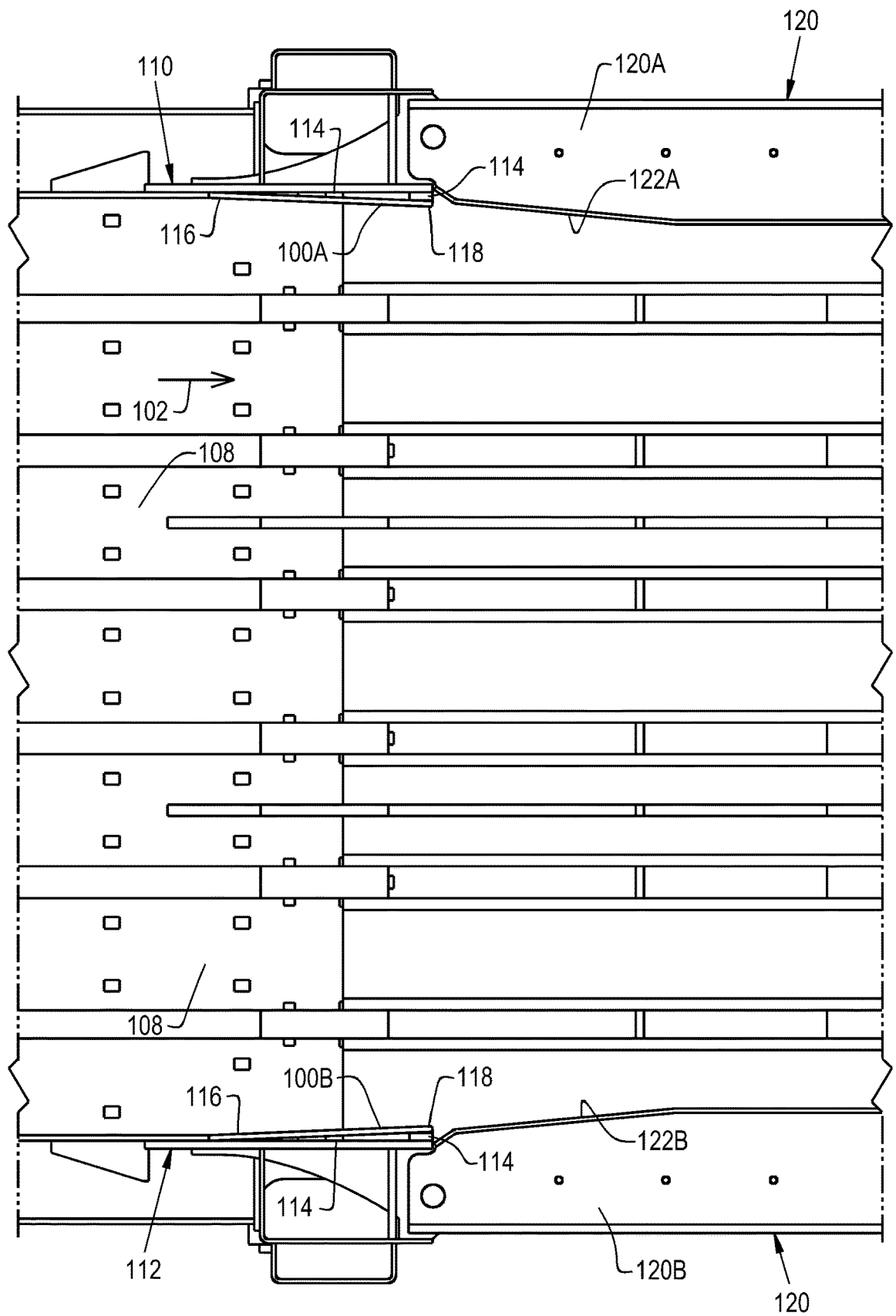
FIG. 5 is a top view of the portion of the main bale chamber shown in FIG. 4.
Figure 6:
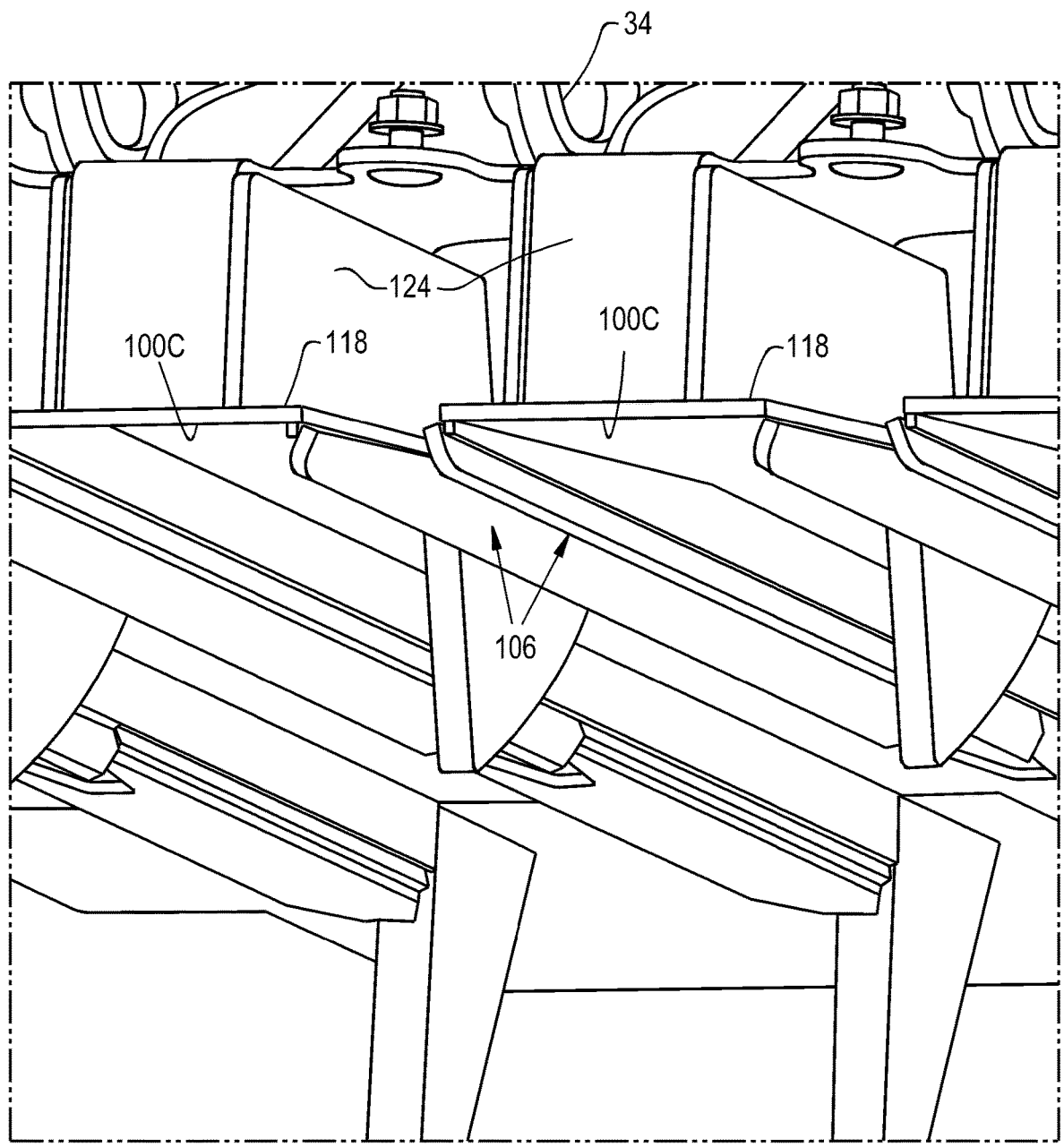
FIG. 6 is a bottom perspective view illustrating the constriction surface in the ceiling of the main bale chamber shown in FIGS. 2 and 3.

The constriction surfaces 100 are also located upstream and immediately adjacent to the plurality of density doors 120 including a first side door 120A positioned downstream and adjacent to the first side wall 110, and a second side door 120B positioned downstream and adjacent to the second side wall 112. The first side door 120A and the second side door 120B each include an inwardly angled surface 122A, 122B, relative to the bale forming direction 102 (FIGS. 4 and 5). The constriction surface 100A of the first side wall 110 terminates at the inwardly angled surface 122A of the first side door 120A, and the constriction surface 100B of the second side wall 112 terminates at the inwardly angled surface 122B of the second side door 120B. Each of the constriction surfaces 100A and 100B project inwardly from the associated adjacent inwardly angled surfaces 122A, 122B, thereby defining a stop which inhibits movement of a bale in a direction opposite to the bale forming direction 102.

Figure 3:
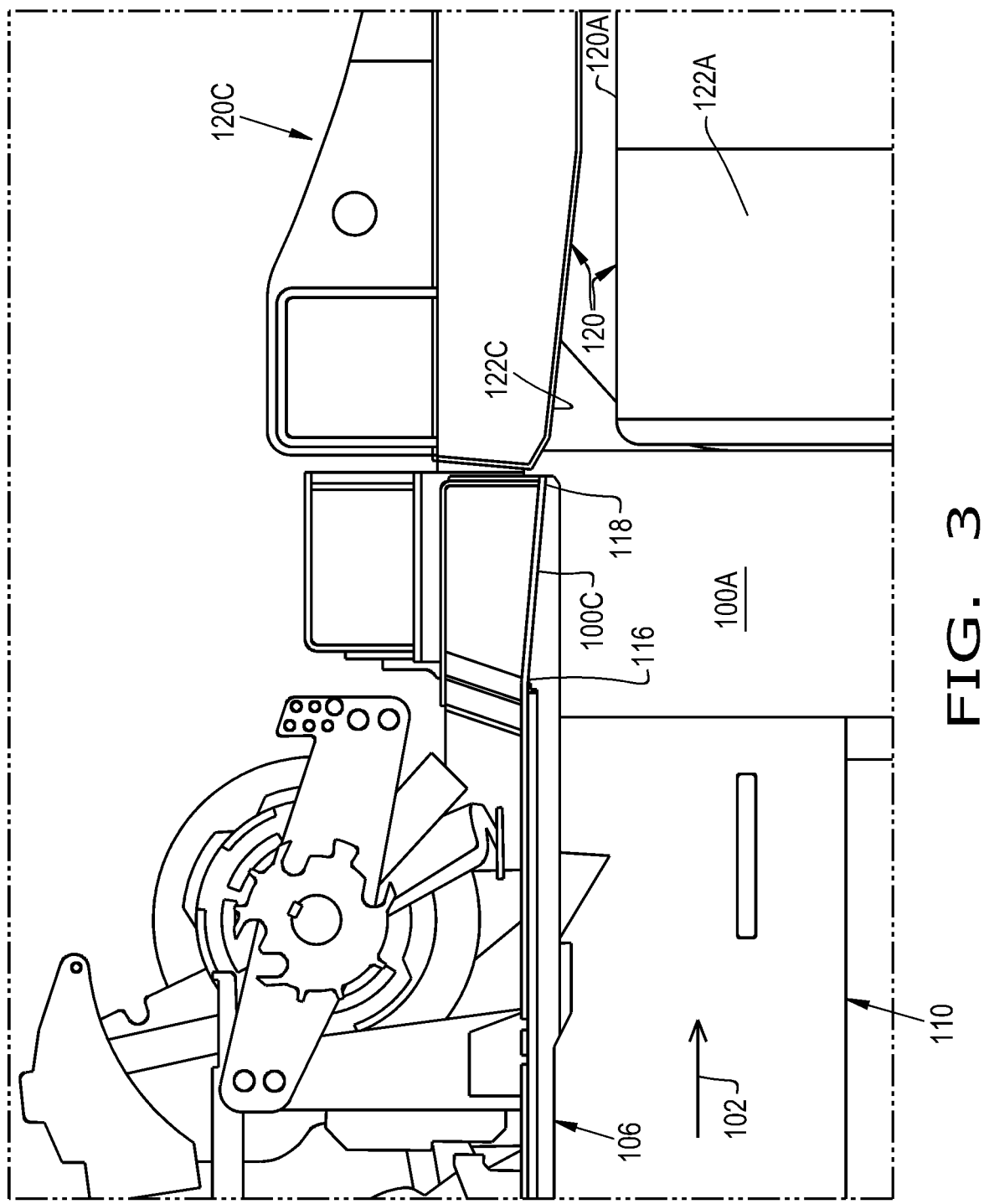
FIG. 3 is a side view of the portion of the main bale chamber arrangement shown in FIG. 2.

The plurality of density doors 120 also include a top door 120C positioned downstream and adjacent to the ceiling 106 (FIG. 3). The top door 120C includes an inwardly angled surface 122C, relative to the bale forming direction 102. The constriction surface 100C of the ceiling 106 terminates at the inwardly angled surface 122C of the top door 120C. The constriction surface 100C of the ceiling 106 projects inwardly from the angled surface 122C of the top door 120C, thereby defining a stop which inhibits movement of a bale in a direction opposite to the bale forming direction 102. In the embodiment shown, the constriction surface 100C formed in the ceiling is part of the knotter frame 124 supporting the knotters 34.

Figure 7:
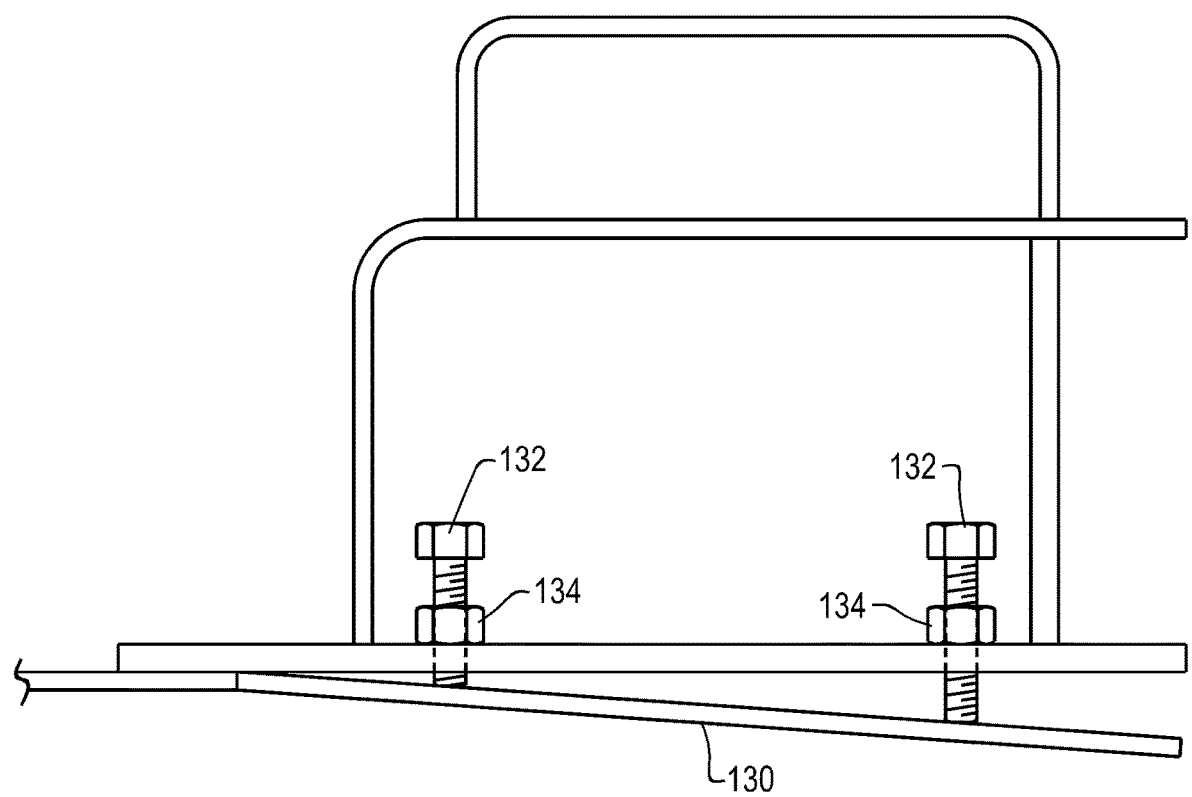
FIG. 7 is a top view of another embodiment of a constriction surfaces of the present invention.

Referring now to FIG. 7, there is shown another embodiment of a constriction surface 130. The constriction surface 130 is shown in the first side wall 110, but can also be formed in the second side wall 112 and/or the ceiling 106. The constriction surface 130 differs from the constriction surface 100 in that it is in the form of a plate that is removable and adjustable relative to the interior of the wall which it forms a part. In the embodiment shown, the constriction surface 130 is removably attached to the first side wall 110 using a plurality of adjustable bolts 132. The bolts are threaded through respective nuts 134, such as lock nuts, which are welded or otherwise affixed to the first side wall 110. The position and angle of the constriction surface 130 can thereby be adjusted, and the constriction surface 130 can also be replaced if it becomes worn. Other ways of attaching the constriction surfaces to the associated side walls and/or ceiling are also possible to make them removable and/or adjustable, depending on the specific application.

During operation, the plunger 26 reciprocates in the main bale chamber 26 between a retracted position and an extended position. When the plunger is at the extended (top dead center) position, crop is compressed to a maximum extent. As the compressed crop advances forward in the bale forming direction 102, the compression of the bale is assisted by the constriction surfaces 100, 130 which reduce the cross sectional area of the main bale chamber 26, prior to entering the area between the density doors 120. The constriction surfaces 100, 130 also act as stops to prevent rearward expansion of the bale when the plunger 26 is not engaged with the bale.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural baler, comprising:
a main bale chamber extending in a bale forming direction from an inlet end to an outlet end, the main bale chamber including a plurality of stationary walls and a plurality of movable density doors positioned downstream from the stationary walls, relative to the bale forming direction, the stationary walls including a ceiling, a first side wall and a second side wall, the plurality of density doors comprise a top door positioned downstream and adjacent to the ceiling, a first side door positioned downstream and adjacent to the first side wall, and a second side door positioned downstream and adjacent to the second side wall; and
a plunger for compressing and moving the crop material from the inlet end towards the outlet end of the bale chamber, the plunger moves between a retracted position and an extended position, at least one of the first side wall, the second side wall and the ceiling having a constriction surface, the constriction surface having an upstream end located immediately downstream from the extended position of the plunger and a downstream end located downstream of the upstream end and immediately preceding the plurality of movable density doors relative to the bale forming direction, the top door, the first side door, and the second side door each having an inwardly angled surface relative to the bale forming direction such that the constriction surface and the angled surfaces constrict the main bale chamber in a direction transverse to the bale forming direction.

2. The agricultural baler according to claim 1, wherein the ceiling comprises the constriction surface.

3. The agricultural baler according to claim 1, wherein each of the first side wall and the second wall comprises the constriction surface.

4. The agricultural baler according to claim 1, wherein the constriction surface is rigidly fixed or removable.

5. The agricultural baler according to claim 4, wherein the constriction surface is removable and adjustable.

6. The agricultural baler according to claim 4, wherein the constriction surface is rigidly fixed in the form of an angled plate.

7. The agricultural baler according to claim 6, wherein the constriction surface of the first side wall terminates at the inwardly angled surface of the first side door, and the constriction surface of the second side wall terminates at the inwardly angled surface of the second side door.

8. The agricultural baler according to claim 7, wherein each of the constriction surfaces projects inwardly from the associated adjacent first side door or second side door, thereby defining a stop inhibiting movement of a bale in a direction opposite to the bale forming direction.

9. The agricultural baler according to claim 1, wherein the at least one constriction surface is positioned at a downstream end of the ceiling, first side wall and/or second side wall, relative to the bale forming direction.

10. The agricultural baler according to claim 1, wherein the ceiling comprises a constriction surface which is formed as part of a knotter frame above the main bale chamber.

11. An agricultural baler, comprising:
a main bale chamber extending in a bale forming direction from an inlet end to an outlet end, the main bale chamber including a plurality of stationary walls and a plurality of movable density doors positioned downstream from the stationary walls, relative to the bale forming direction, the stationary walls including a ceiling, a first side wall and a second side wall, the plurality of density doors comprise a top door positioned downstream and adjacent to the ceiling, a first side door positioned downstream and adjacent to the first side wall, and a second side door positioned downstream and adjacent to the second side wall; and
a plunger for compressing and moving the crop material from the inlet end towards the outlet end of the bale chamber, the plunger moves between a retracted position and an extended position, the first side wall and the second side wall each having a constriction surface, the constriction surface having an upstream end located immediately downstream from the extended position of the plunger and a downstream end located downstream of the upstream end and immediately preceding the plurality of movable density doors relative to the bale forming direction, the top door, the first side door, and the second side door each having an inwardly angled surface relative to the bale forming direction such that the constriction surface and the angled surfaces constrict the main bale chamber in a direction transverse to the bale forming direction, the constriction surface of the first side wall terminates at the inwardly angled surface of the first side door, and the constriction surface of the second side wall terminates at the inwardly angled surface of the second side door.

12. The agricultural baler of claim 11, further comprising a constriction surface forming an inner surface of the ceiling that is rigidly affixed as part of the ceiling, the constriction surface of the ceiling being formed as a bend in the plates defining the ceiling.

13. The agricultural baler according to claim 12, wherein the ceiling comprises the constriction surface.

14. The agricultural baler according to claim 12, wherein each of the first side wall and the second wall comprises the constriction surface.

15. The agricultural baler according to claim 12, wherein the constriction surfaces are rigidly fixed or removable.

16. The agricultural baler according to claim 15, wherein the constriction surfaces are removable and adjustable.

17. The agricultural baler according to claim 15, wherein the constriction surfaces are rigidly fixed in the form of an angled plate.

18. The agricultural baler according to claim 17, wherein each of the constriction surfaces projects inwardly from the associated adjacent first side door or second side door, thereby defining a stop inhibiting movement of a bale in a direction opposite to the bale forming direction.

19. The agricultural baler according to claim 12, wherein the at least one constriction surface is positioned at a downstream end of the ceiling, first side wall and/or second side wall, relative to the bale forming direction.

20. The agricultural baler according to claim 12, wherein the ceiling comprises a constriction surface which is formed as part of a knotter frame above the main bale chamber.

* * * * *